(12) United States Patent
Lewis

(10) Patent No.: US 6,359,422 B1
(45) Date of Patent: Mar. 19, 2002

(54) SURGE RESISTOR FOR PROTECTING ACTIVE SOURCE OF VARIABLE INDUCTANCE IN A POWER-FACTOR CORRECTION ARRANGEMENT

(75) Inventor: Eric Anthony Lewis, Warwickshire (GB)

(73) Assignee: Alston UK Ltd. (GB)

( * ) Notice: Subject to any disclaimer, the term of this patent is extended or adjusted under 35 U.S.C. 154(b) by 0 days.

(21) Appl. No.: 09/463,811

(22) PCT Filed: May 27, 1999

(86) PCT No.: PCT/GB99/01693

§ 371 Date: Mar. 16, 2000

§ 102(e) Date: Mar. 16, 2000

(87) PCT Pub. No.: WO99/63640

PCT Pub. Date: Dec. 9, 1999

(30) Foreign Application Priority Data

May 29, 1998 (GB) ............................................... 9811488

(51) Int. Cl.[7] .................................................. G05F 1/70
(52) U.S. Cl. ....................................................... 323/207
(58) Field of Search ................................. 323/205, 207, 323/208; 307/105; 363/39–41

(56) References Cited

U.S. PATENT DOCUMENTS

| | | |
|---|---|---|
| 4,047,097 A | 9/1977 | Gyugyi et al. |
| 5,424,626 A * | 6/1995 | Roberts ....................... 323/208 |
| 5,731,965 A * | 3/1998 | Cheng et al. .................. 363/41 |
| 5,757,099 A * | 5/1998 | Cheng et al. ................ 307/105 |

FOREIGN PATENT DOCUMENTS

| | | |
|---|---|---|
| GB | 1 456 575 | 11/1976 |
| GB | 3 267 582 A | 5/1986 |

* cited by examiner

Primary Examiner—Adolf Deneke Berhane
(74) Attorney, Agent, or Firm—Kirschstein, et al.

(57) ABSTRACT

A power-factor correction arrangement incorporates an active inductance source and a passive capacitance source switchably connected in parallel across a source of AC power. The active and passive sources are directly interconnected at their switched ends by a resistance, the value of which is chosen so that, when the passive source is switched into circuit while the active source is already connected to the AC source, the current through the passive source suffers virtually no surge.

7 Claims, 7 Drawing Sheets

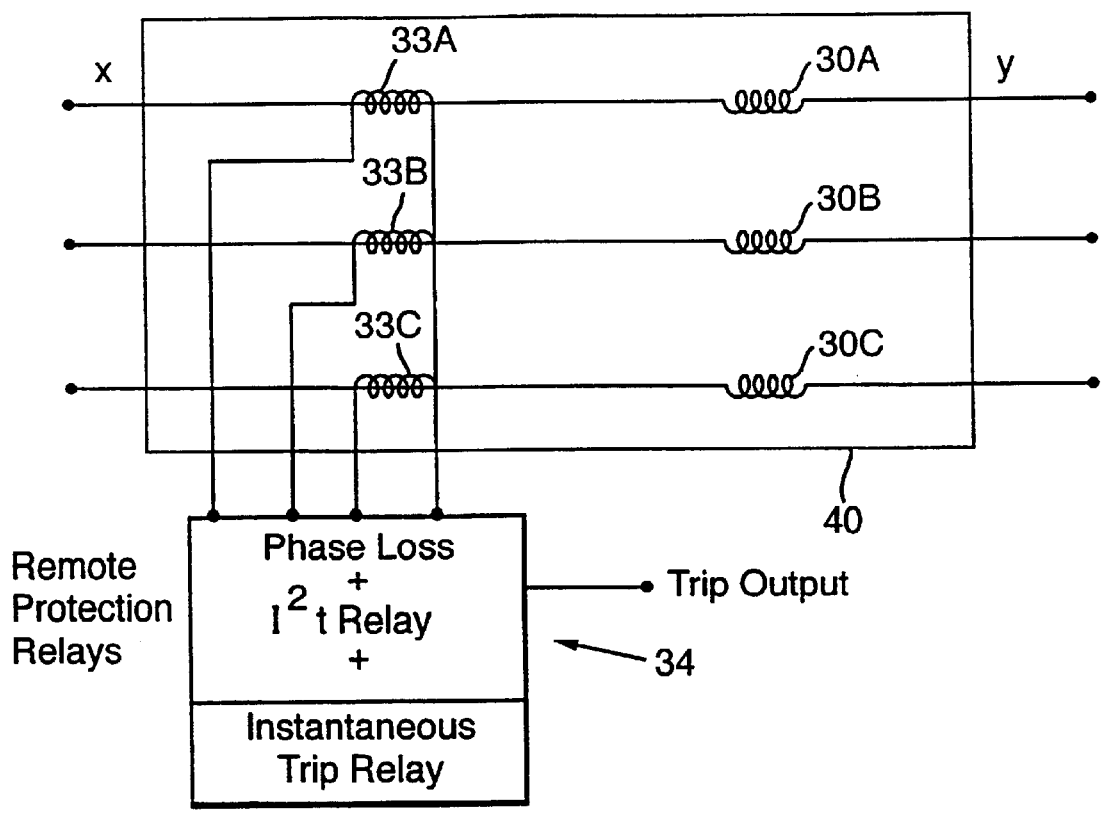

SURGE RESISTOR FOR PROTECTING ACTIVE SOURCE OF VARIABLE INDUCTANCE IN A POWER-FACTOR CORRECTION ARRANGEMENT

BACKGROUND OF THE INVENTION

The invention relates to a power-factor correction arrangement in which an active source of variable inductance and a passive source of capacitance are switchably disposed in parallel across a source of AC power, the passive device being arranged to be switched into circuit after the active device.

One example of a known power-factor correction arrangement is shown in FIG. 1 and is based on the disclosure of UK patent GB 2,167,582 filed in the name of the General Electric Company plc and published on May 29, 1986. In this arrangement a source of AC power, e.g. an 11 kV bus 10, feeds in parallel through respective AC circuit breakers 11, 12 and 13 a pair of loads 14, an active source of variable inductance 15 and a filter bank 16. These items involve conventional three-phase circuits, though only one phase is shown in the diagram. The loads in this example are constituted by a pair of DC motors 17 fed from a pair of thyristor convertors 18 which in turn are supplied with power from the bus via transformers 19. The variable-inductance source 15 comprises essentially a passive inductor 20 connected to a pair of series-connected thyristor bridge convertors 21 which in turn are fed from the separate secondaries of a transformer 22. The convertors control the firing of the thyristors by way of a multipulse output such as to provide in the stage 15 a current of variable lagging phase, this current flowing through the AC power bus 10. The filter bank 16 is in three stages, each designed to attenuate a particular harmonic of the AC source frequency but also to provide at that source frequency a net capacitive reactance, i.e. the filter appears as a leading-phase branch across the supply 10.

In one mode of operation of this arrangement, the filter 16 is arranged to provide leading current to fully compensate the full-load lagging reactive power of the loads 14. At less than full load, however, the capacitors in the filter bank 16 overcompensate and would give rise to a net leading reactive power in the system, were it not for the fact that the variable-inductance stage 15 is arranged to provide further lagging VARs (volt-amps reactive) to make up for the shortfall of lagging VARs in the motors. Thus, the lagging current in stage 15 and that in the load combine at all values of loading to equal the leading current in the filter bank 16, thereby giving rise to a substantially unity power factor.

In an alternative, and commonly employed, mode of operation the filter bank is switchable by additional circuits (not shown) between different values of capacitance such as to provide incremental changes in leading VARs to suit widely differing load conditions, the variable-inductance stage 15 then being controlled as before to provide zero net power factor. In other circumstances (for example, when the loads 14 are not in use for a significant period) the filter stage may need to be switched out of circuit together with the stage 15 in order to save energy. When the filter stage is switched in, there is found to occur a large pulse of current through the filter, followed by a large voltage surge which affects the filter components, the waveform of the AC power source and all other circuits connection to the bus 10. These surges can cause significant stress to the filter capacitors and other circuits and lead to the necessity to limit the switching rate of the filter stage 16 to a rate which is unacceptably low.

Waveforms relating to the power-factor correction arrangement just described are shown in FIG. 2. In FIG. 2, at a time 1.09 s approximately, the filter breaker 13 is closed, giving rise to a period in which a surge current 40 flows through the filter. FIG. 2 shows the three AC currents flowing into the filter stage which all start at the approximately 1.09 s point. There will be three corresponding AC voltage in the AC power system 10, but only the worst-affected of these is shown to aid clarity. At the same point in time, the supply voltage waveform 41 experiences a pronounced dip 42, followed approximately 10 ms later by a large voltage rise 43 amounting to an approximately 54% increase over normal peak voltage levels.

One known way of dealing with the undesirable current surge is illustrated in FIG. 3. In FIG. 3 the AC circuit breaker 13 is bypassed by a resistor 23 in series with an additional AC circuit breaker 24. Now, when the filter bank is due to be switched (it is assumed that breaker 12 is closed), breaker 24 is closed with breaker 13 open, so that the filter stage 16 is connected to the supply via the resistor 23, this serving to reduce the current surge. A short time later, breaker 13 is closed to fully energize the filter stage. A drawback with this approach, however, is the need for the further circuit breaker 24 (there will be one per phase). This component is not only expensive, it also takes up space and may in practice be difficult to retrofit on an existing control panel.

In a second known technique for minimizing filter current pulses during switching, the standard circuit breaker 13 is replaced by a special device having three independent contacts, or poles, operated by a special control arrangement. In operation, when the filter is to be switched into circuit, the first two poles are closed when the supply voltage is at a zero value and the third is then closed a few milliseconds later. Waveforms analogous to those of FIG. 2 but relating to this technique are shown in FIG. 4. This figure shows the point of closure 44 of the first two poles and that of the third (45) very shortly afterwards. In FIG. 4 only that voltage waveform is shown which is worst affected (43). The waveform which causes the poles to close at 44 is not shown. It can be seen that, though the levels of the current and voltage surges are reduced when compared with the basic arrangement of FIG. 1, they are still quite appreciable.

While this second technique is partially effective in reducing the undesired surges through the filter, it requires the use of an expensive, non-standard circuit breaker which, as in the case of the first solution, may be difficult to accommodate in already existing control equipment.

SUMMARY OF THE INVENTION

In accordance with the present invention, there is provided a power-factor correction arrangement, comprising an active source of variable inductance and a passive source of capacitance, the active and passive sources being connected to a source of AC power by way of respective first and second switching means, the arrangement being configured to close the second switching means while the first switching means is in a closed state, the active and passive sources being interconnected at their switched ends by means of a resistance.

Preferably, the resistance is chosen to have a value such that a magnitude of a current in the passive source during a closed state of the first switching means suffers substantially no change following closure of the second switching means.

The passive source may be constituted by one or more capacitors in combination, being either effectively pure capacitance or an inductance-capacitance combination forming a filter arrangement.

The active source may be constituted by, for example, a thyristor-controlled reactor or a pair of series-connected multipulse thyristor bridges.

BRIEF DESCRIPTION OF THE DRAWINGS

An embodiment of the invention will now be described, by way of example only, with reference to the drawings, of which.

DETAILED DESCRIPTION OF THE PREFERRED EMBODIMENT

Figure 1:
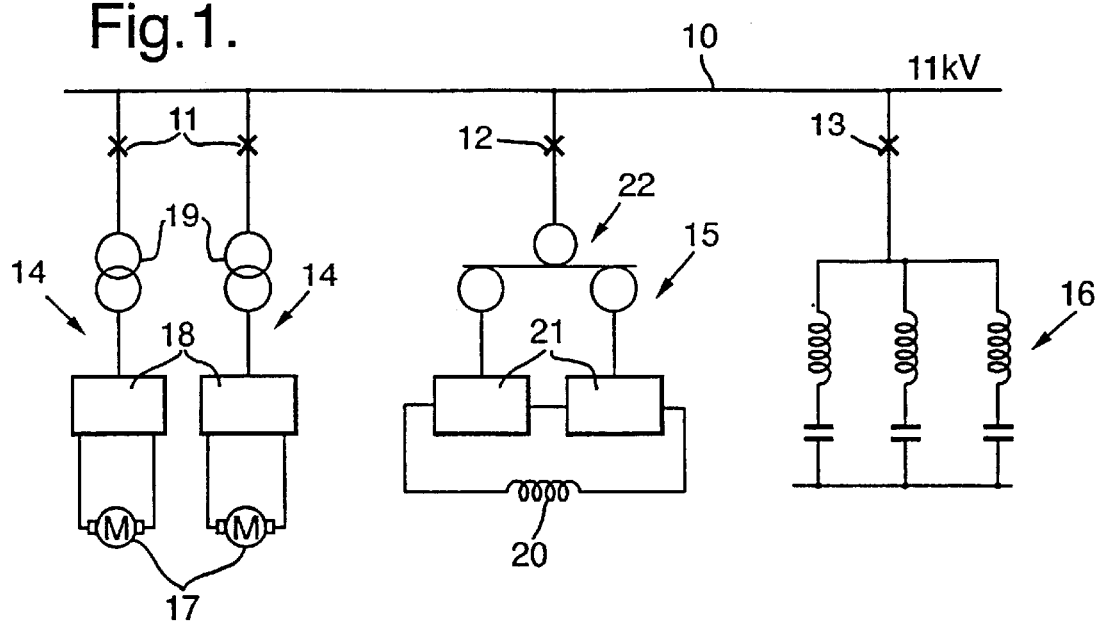
FIG. 1 is a schematic diagram of a known prior art power-factor correction arrangement subject to undesirable current and voltage filter-switching surges.
Figure 3:
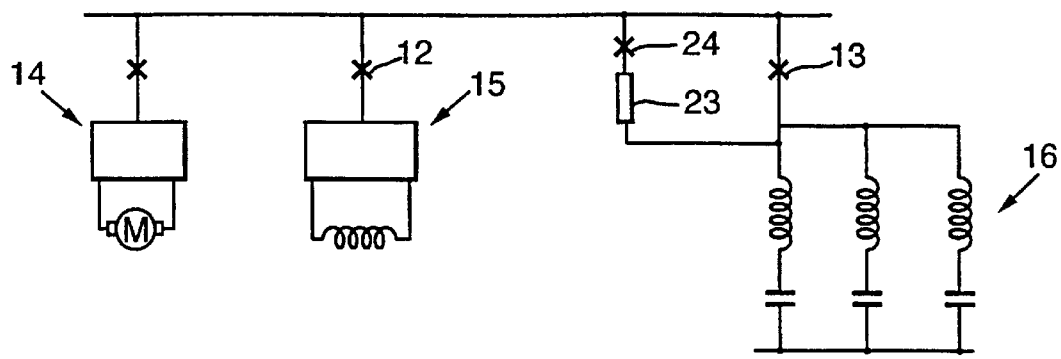
FIG. 3 is a schematic diagram showing a prior-art technique for reducing the surges experienced in the arrangement of FIG. 1.
Figure 5:
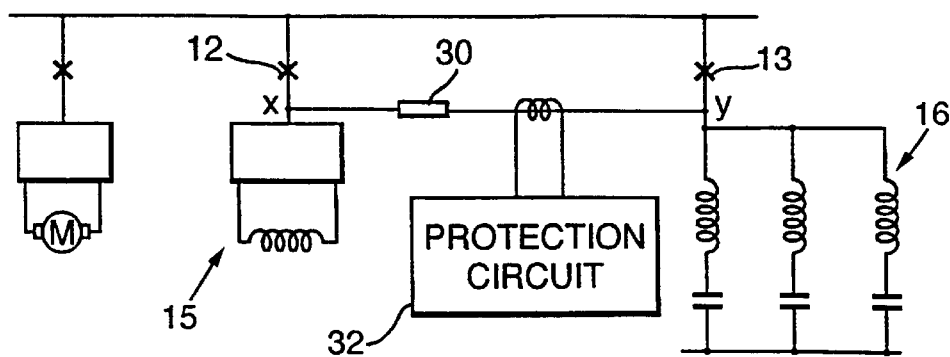
FIG. 5 is a schematic diagram of a power-factor correction arrangement in accordance with the invention.
Figure 2:
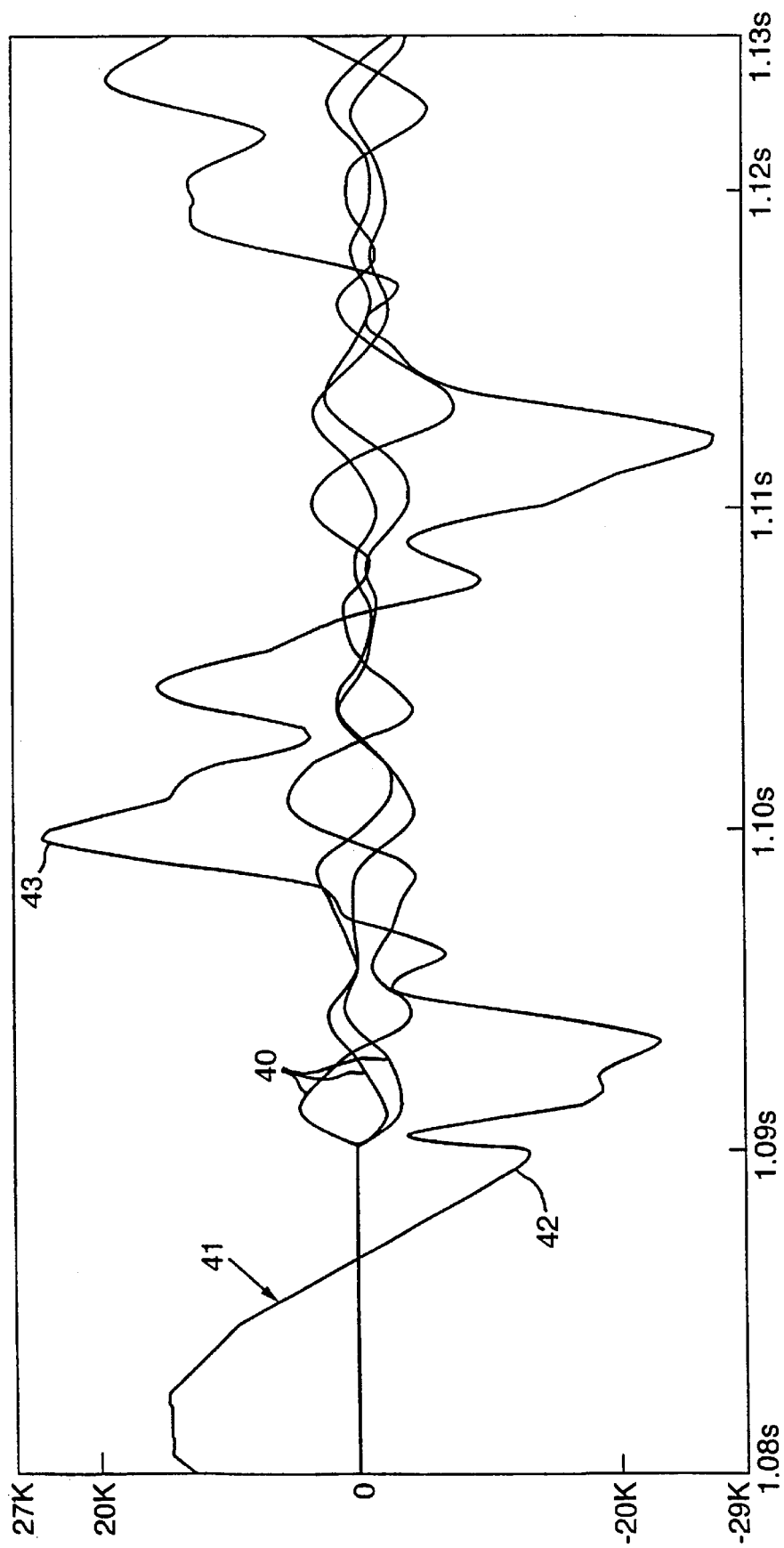
FIG. 2 is a waveform diagram showing the existence of current and voltage surges in the arrangement of FIG. 1.
Figure 4:
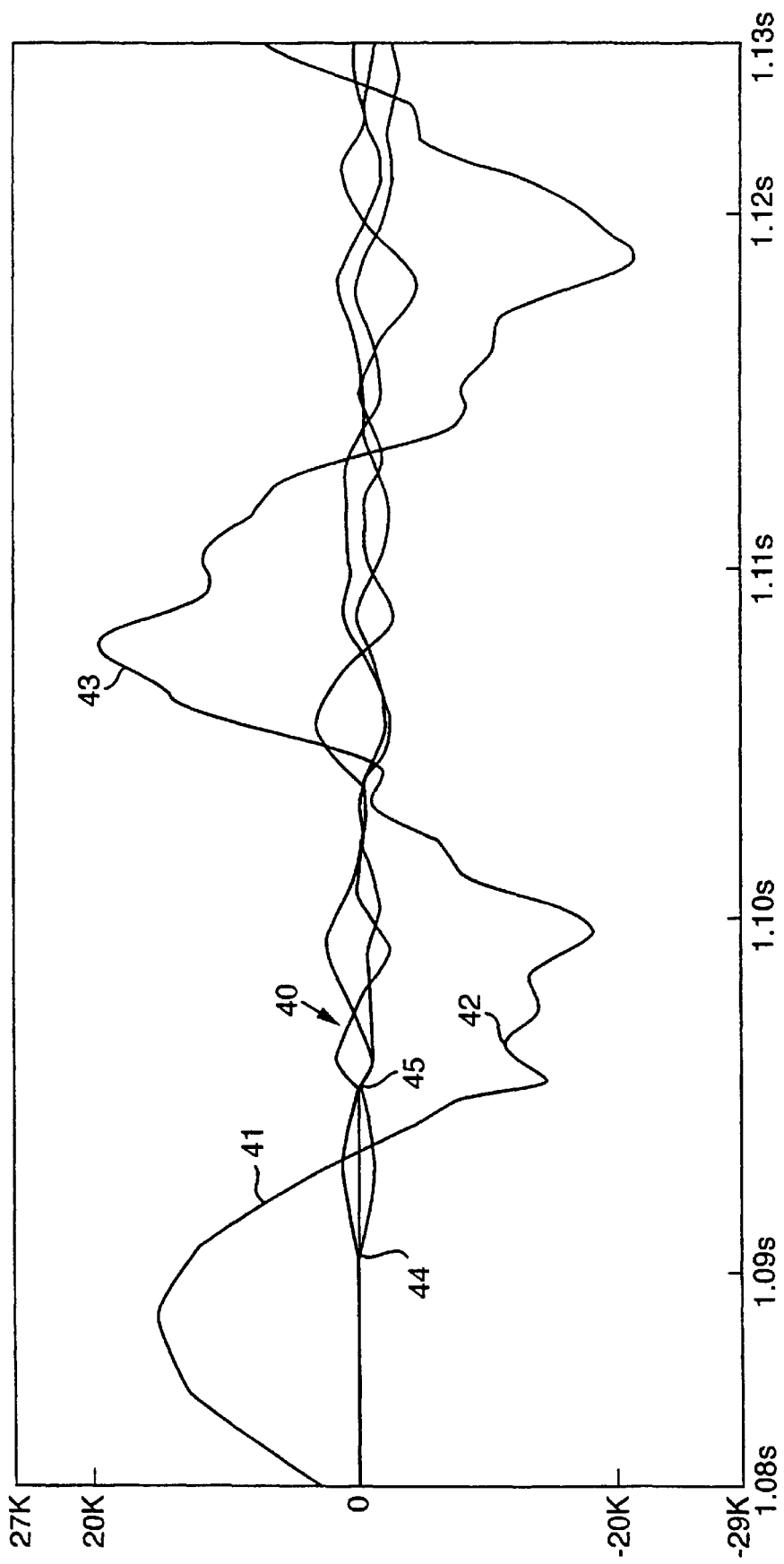
FIG. 4 is a waveform diagram showing the effect of a second prior-art surge-reducing technique.

A solution of the present invention to the current and voltage-pulse problem is illustrated in FIG. 5 and comprises the connecting of a resistance 30 (which may in practice be constituted by a single resistor or a combination of resistors) between the variable-inductance stage 15 at the point where it connects to the circuit breaker 12 and the filter stage 16 at the point where it connects with the circuit breaker 13. The value of the resistor 30 is chosen to be such as to minimize surges in the filter when the breaker 12 is closed, followed by breaker 13. The exact value depends on the particular AC system involved, its power rating, etc.

Figure 6A:
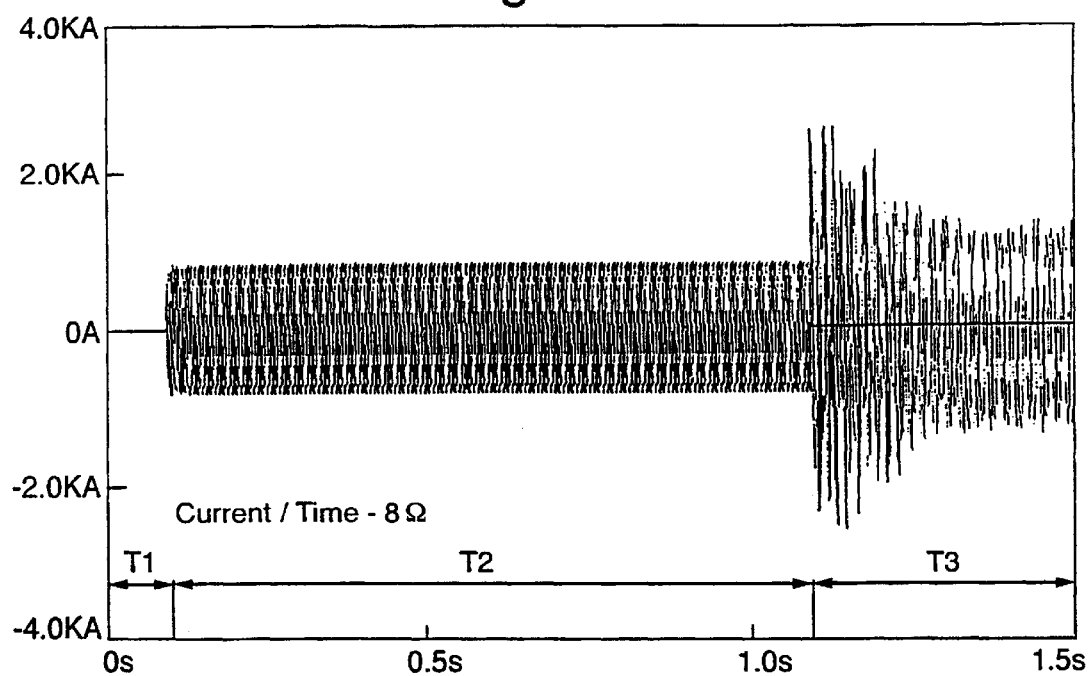
FIGS. 6a, 6b, 7a, 7b and 8a, 8b are waveform diagrams illustrating the effect on current and voltage, respectively, of the surge-reducing resistance provided by the power-factor correction arrangement of FIG. 5 for three different values of that resistance, and FIG. 9 gives details of a typical protection arrangement for incorporation into the power-factor correction arrangement according to the invention; many variations are, however, possible.
Figure 6B:
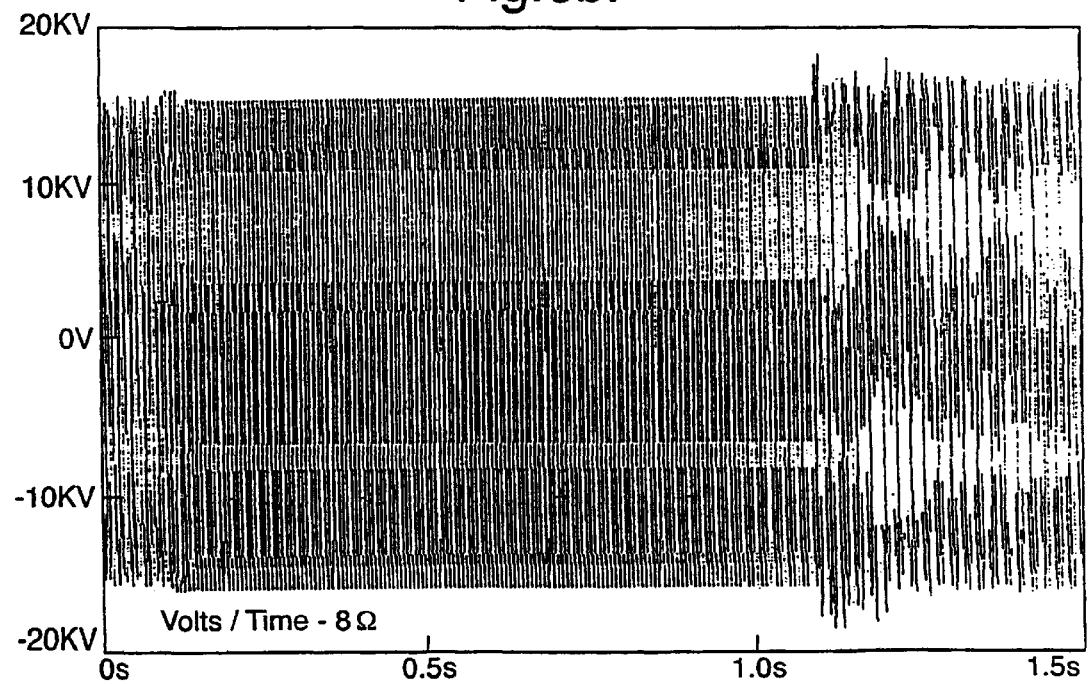
Figure 7A:
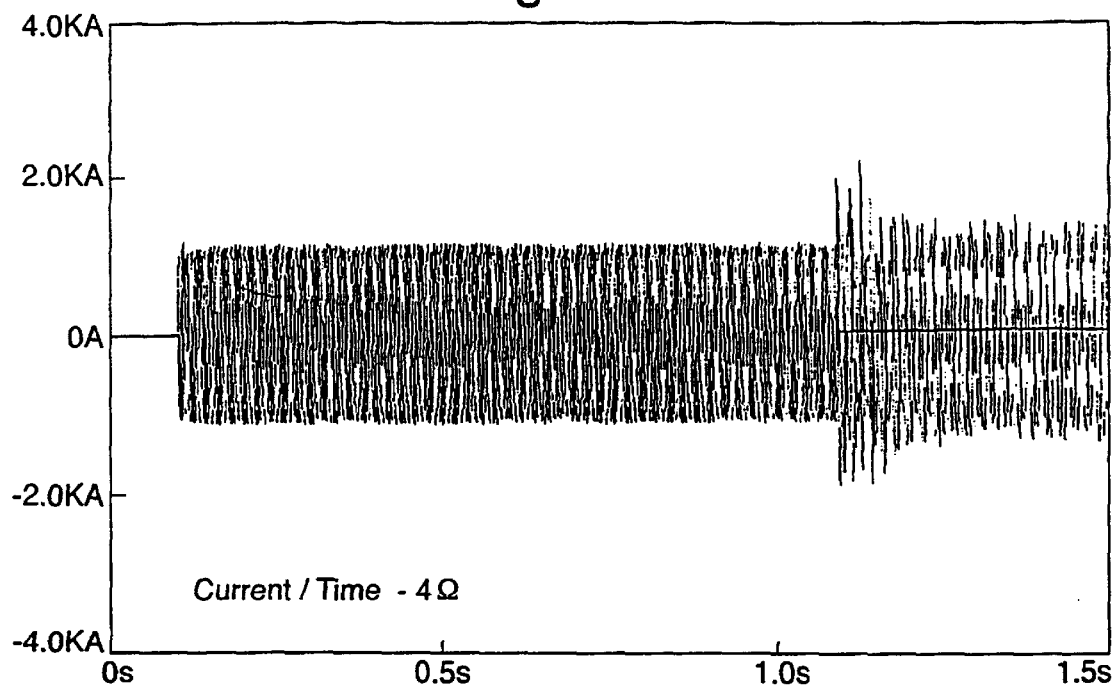
Figure 7B:
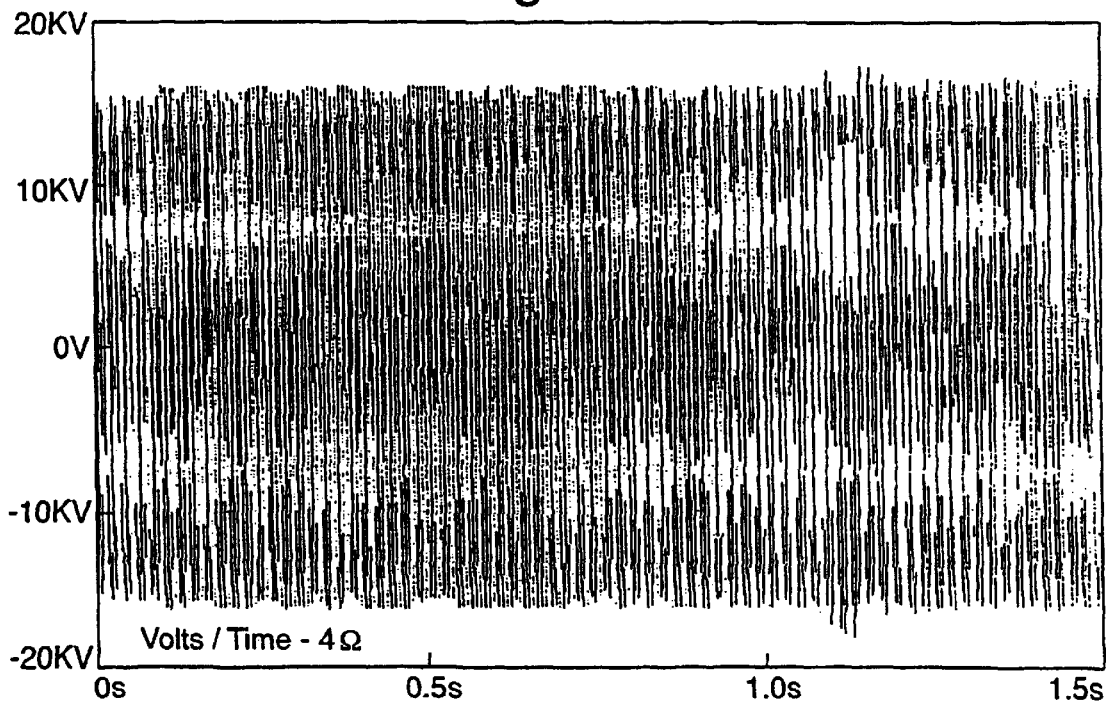
Figure 8A:
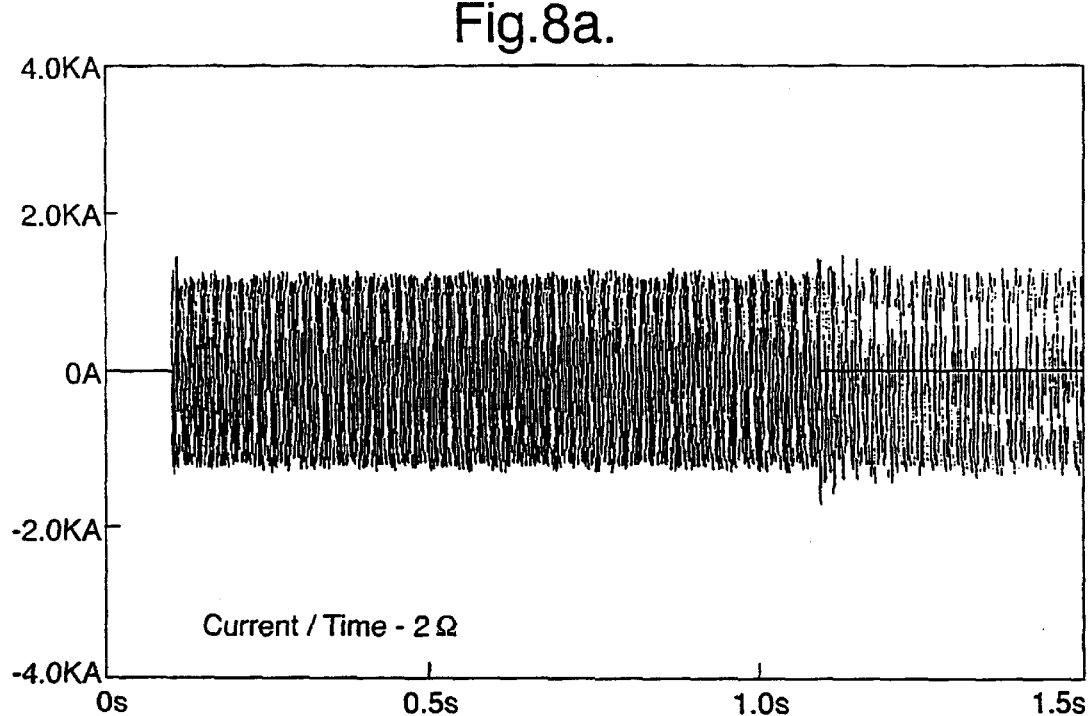
Figure 8B:
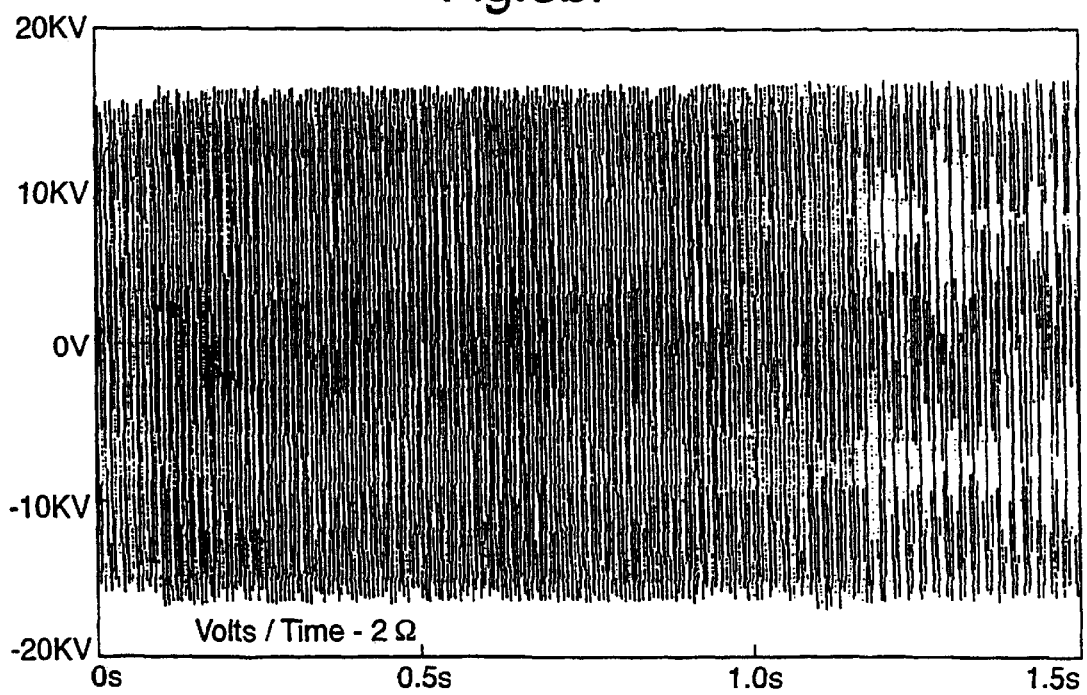

A set of waveforms of filter current and AC busbar 10 voltage for an 11 kV, 30 MW power system as modelled in a simulation routine are shown in FIGS. 6, 7 and 8 for three different values of resistor 30, namely 80 Ohm, 4 Ohm and 2 Ohm (the resistors in all three phases are equal). In each case it is assumed that initially, during a period T1 (see FIG. 6a), the circuit breakers 12 and 13 associated with the variable-inductance-stage 15 and filter stage 16, respectively, are open; during a period T2 the circuit breaker 12 is closed, but breaker 13 is still open and, lastly, during an open-ended period T3 breaker 13 is closed. It can be seen how, in the 8 Ohm case, there is a marked discontinuity when breaker 13 is closed, the very condition which is to be avoided. However, for smaller values of resistance the discontinuity is considerably reduced, so that at 2 Ohm the current and voltage surges are negligible. The acts resistance value decided on depends on the amount of surge which can be tolerated, and in this instance either 2 Ohm or 3 Ohm might well be the preferred value.

A marked feature of this inventive arrangement is that, since resistors 30 (considering all three phases now) are only intended to pass current for a very short time, e.g. of the order of 1 second, they can take the form of inexpensive generally low-power devices, provided they have an adequate surge capability. The exact power rating will depend on the duty cycle, which will vary from system to system. In some systems the filter may orgy be switched once every, say, 3 weeks, whereas in other systems switching may be far more frequent, even every 10 minutes or so. Even if the switching frequency is as frequent as in the latter case, the duty cycle is still low enough to enable inexpensive resistors to be used.

In practice, the integrity of the resistors in the various phases will normally be monitored by means of a protection circuit such as that shown at 32 (see FIG. 5). FIG. 9 illustrates this in more detail In FIG. 9 the protection circuit comprises in the same housing 40 the three resistors 30A, B and C for the three phases and, in the respective lines feeding those resistors, associated current transformers 33A, B and C. The outputs of the current transformers are taken to a monitoring section 34 which monitors, among other tings, the open s of any one resistor in the group of three (i.e., loss of current in one of the phases), and the levels of current in the resistors with respect to time.

The monitoring section 34 conveniently takes the form of a known protective "black box" relay which gives a trip output when $I^2t$ (a measure of the power dissipated over time t, where I is the current) is more than a first predetermined value, or the instantaneous current is more than a second predetermined value, or there is a loss of any one or more of the phases. An example of a protective relay suitable for such duty is the MIDOS (Modular Integrated Drawout System) protective relay marketed by ALSTOM T&D PROTECTION & CONTROL LTD., St Leonards Works, Stafford ST17 4LX, England.

An analysis of the power-factor protection arrangement shows that it can be implemented safely, the various fault scenarios being as follows (see FIG. 5):

Circuit breaker 12 goes open—this is an inherently safe condition.

C Short-circuit from point X to ground—circuit breaker 12 is arranged to trip (open).

One resistor 30 goes open-circuit—a phase imbalance is detected and breaker 12 is tripped.

One resistor 30 goes short-circuit—a virtually impossible scenario, but is protected by instantaneous protection anyway, then breaker 12 is tripped.

Short-circuit from point Y to ground—this is detected by the instantaneous protection then breaker 12 is tripped.

Circuit breaker 13 fails to close—the predetermined $I^2t$ setting is exceeded and breaker 12 is consequently tripped.

Circuit breaker 12 trips while the circuit is in operation—the breaker 13 is arranged to be tripped as well.

Circuit breaker 13 trips while running—the breaker 12 is arranged to be tripped as well.

A summary of the advantages of the power-factor correction arrangement according to the present invention is as follows:

(1) Reduced stress on the filter capacitors and all circuits on the AC bus, due to negligible current and voltage surges.

(2) Inexpensive, generally low-power, short-time rated resistors can be used.

(3) Frequent filter-switching operations are possible, enabling the use of the filter to be optimized.

(4) No additional standard AC circuit breaker is required; alternatively, no special circuit breaker required.

(5) No losses in the resistors when filter is operating in steady-state.

(6) Circuit is easily protected using AC current transformers and conventional fault-detection techniques.

(7) The inrush current through the transformers 19 may be reduced. This is due to the fact that, when circuit breaker 12 closes, the resistors 30 form a parallel current path through the filter 16, the leading current through that path acting to offset the lagging current through the motors 17.

Although it has been assumed that the passive source of capacitance 16 will be a filter circuit involving inductance as well as capacitance, it may alternatively be pure capacitance without in any way affecting the operation of the invention. Also, the active inductance source may be any static VAR device, e.g. a thyristor-controlled reactor (TCR) or an active VAR generator using forced commutated power semiconductors. Further, the load with which the described inventive power-factor correction arranged is used can be any load which produces lagging reactive VARs, not solely a DC motor load.

What is claimed is:

1. A power-factor correction arrangement, comprising:

a) an active source of variable inductance;

b) a first switching circuit switchable between open and closed states, and operative for switchably connecting the active source in parallel across a supply of AC power in the closed state of the first switching circuit, the first switching circuit being connected to the active source at a first switching junction;

c) a passive source of capacitance;

d) a second switching circuit switchable between open and closed states, and operative for switchably connecting the passive source in parallel across the supply of AC power in the closed state of the second switching circuit while the first switching circuit is in the closed state of the first switching circuit, thereby drawing a surge electrical current through the passive source, the second switching circuit being connected to the passive source at a second switching junction; and e) a surge resistance interconnected between the first and second switching junctions, and operative for reducing the surge current to protect the passive source.

2. The power-factor correction arrangement as claimed in claim 1, wherein the surge resistance has a value such that a magnitude of the surge current through the passive source during the closed state of the first switching circuit suffers substantially no change following the switching of the second switching circuit to the closed state of the second switching circuit.

3. The power-factor correction arrangement as claimed in claim 1, wherein the passive source is constituted by at least one capacitor.

4. The power-factor correction arrangement as claimed in claim 1, wherein the passive source is an inductance-capacitance filter.

5. The power-factor correction arrangement as claimed in claim 1, wherein the active source is constituted by a thyristor-controlled reactor.

6. The power-factor correction arrangement as claimed in claim 1, wherein the active source is constituted by a pair of series-connected multipulse thyristor bridges.

7. The power-factor correction arrangement as claimed in claim 1; and further comprising a protection circuit for monitoring the integrity of the surge resistance, the protection circuit comprising monitoring means for monitoring loss of the surge current in the surge resistance and a surge current level in the surge resistance with respect to time, and relay means operated by the monitoring means for disconnecting the active source if the current loss occurs or if a predetermined current level is exceeded.

* * * * *